(12) United States Patent
Plavetich et al.

(10) Patent No.: US 7,401,851 B2
(45) Date of Patent: Jul. 22, 2008

(54) STOWABLE PASSENGER SEAT WITH ROLL BAR

(75) Inventors: Richard Plavetich, Laguna Beach, CA (US); John Cupit, Olivehain, CA (US)

(73) Assignee: Nissan Design America, Inc., San Diego, CA (US)

( * ) Notice: Subject to any disclaimer, the term of this patent is extended or adjusted under 35 U.S.C. 154(b) by 20 days.

(21) Appl. No.: 11/320,236

(22) Filed: Dec. 28, 2005

(65) Prior Publication Data

US 2007/0145788 A1 Jun. 28, 2007

(51) Int. Cl.
B60N 2/427 (2006.01)
B60N 2/42 (2006.01)
B60N 2/32 (2006.01)
B60R 21/13 (2006.01)
B60J 7/02 (2006.01)

(52) U.S. Cl. ............... 297/216.12; 297/14; 280/756; 296/107.2

(58) Field of Classification Search ........... 297/216.12, 297/14, 15; 280/756; 296/68.1, 107.2, 107.19, 296/107.08, 107.07, 107.03
See application file for complete search history.

(56) References Cited

U.S. PATENT DOCUMENTS

| | | | |
|---|---|---|---|
| 1,156,408 A | 10/1915 | Kiehler | |
| 1,591,153 A | 7/1926 | Bourgon | |
| 1,751,378 A | 3/1930 | Zaiden | |
| 1,796,081 A | 3/1931 | Bundy | |
| 1,806,692 A | 5/1931 | Lemon | |
| 1,816,937 A | 8/1931 | Scott | |
| 1,895,832 A | 1/1933 | Zucca | |
| 2,043,804 A | 6/1936 | Montgomery | |
| 2,046,175 A | 6/1936 | Lim | |
| 2,880,033 A | 3/1959 | Shelton | |
| 3,290,086 A | 12/1966 | Petrak | |
| 3,323,828 A | 6/1967 | Esche | |
| 3,413,031 A | 11/1968 | Gafvert et al. | |
| 4,103,961 A | 8/1978 | Cert et al. | |
| 4,139,232 A | 2/1979 | Cerf et al. | |
| 4,182,468 A | 1/1980 | Hoerner | |
| 4,557,502 A | 12/1985 | Scaduto et al. | |
| 4,699,418 A | 10/1987 | Plavetich | |
| 4,750,778 A | 6/1988 | Hoban | |
| 5,056,816 A * | 10/1991 | Lutze et al. | 280/756 X |
| 5,094,478 A * | 3/1992 | Pfanzeder et al. | 280/756 |
| 5,205,585 A * | 4/1993 | Reuber et al. | 280/753 |
| 5,236,219 A * | 8/1993 | Jambor et al. | 280/756 |
| 5,265,930 A * | 11/1993 | Klein et al. | 280/756 X |
| 5,284,360 A * | 2/1994 | Busch et al. | 280/756 |
| 5,393,093 A | 2/1995 | Wunsche et al. | |

(Continued)

Primary Examiner—Rodney B. White
(74) Attorney, Agent, or Firm—Young Basile

(57) ABSTRACT

A rumble seat for increasing passenger capacity of a motor vehicle by at least one occupant includes a combination seat back frame and roll bar moveable between a retracted position and an extended position. The combination seat back frame and roll bar can be selectively operated for carrying at least one additional passenger when in the extended position, while providing a substantially uninterrupted exterior motor vehicle contour when in the retracted position. A track mechanism and a plurality of rotatable elongate linkages can be provided for guiding movement of the combination seat back frame and roll bar between the retracted and extended positions. The track mechanism can include a guide track having an L-shaped configuration with an upper horizontally extending segment and a lower vertically extending segment.

21 Claims, 3 Drawing Sheets

U.S. PATENT DOCUMENTS

| | | | |
|---|---|---|---|
| 5,458,396 A * | 10/1995 | Rost | 297/216.12 |
| 5,533,774 A | 7/1996 | Cavanaugh | |
| 5,626,361 A * | 5/1997 | Heiner | 280/756 |
| 5,927,803 A * | 7/1999 | Hehl et al. | 297/216.12 |
| 6,237,981 B1 | 5/2001 | Selleck | |
| 6,352,285 B1 * | 3/2002 | Schulte et al. | 280/756 |
| 6,511,095 B1 * | 1/2003 | Kober et al. | 280/756 |
| 6,899,367 B1 | 5/2005 | Plavetich et al. | |
| 6,899,378 B2 | 5/2005 | Rhodes et al. | |
| 7,036,866 B2 * | 5/2006 | Perakis | 296/107.2 |
| 7,156,446 B2 * | 1/2007 | Perakis | 296/107.2 |
| 7,175,199 B2 * | 2/2007 | Muller | 280/756 |
| 7,198,294 B2 * | 4/2007 | Welch | 280/756 |
| 2005/0082808 A1 * | 4/2005 | Wildig et al. | 280/756 |
| 2006/0097499 A1 * | 5/2006 | Welch | 280/756 |
| 2007/0199759 A1 * | 8/2007 | Tang | 280/756 X |
| 2007/0200330 A1 * | 8/2007 | Tang | 280/756 |
| 2007/0200331 A1 * | 8/2007 | Tang | 280/756 |
| 2007/0200400 A1 * | 8/2007 | Tang et al. | 297/216.12 |

* cited by examiner

STOWABLE PASSENGER SEAT WITH ROLL BAR

BACKGROUND

The invention relates to seating for vehicles, and in particular to selectively operable seating for vehicles in which part or parts of the seat form in one position a part of the contour or structure of the vehicle's body.

Selectively operable rear row seats are generally known in the industry. In the 1920's-1960's many vehicles were sold and included selectively operable rear row seats, sometimes referred to as rumble seats or jump seats. The seats were typically located in a trunk area and were designed to carry additional passengers when in an extended position, and to provide a conventional vehicle appearance when in a retracted position. When placed in a retracted position, these seats typically define, or allow placement of, a cover that defines a portion of the exterior vehicle surface. In this manner, a substantially continuous or uninterrupted exterior vehicle contour is be presented when the seat is in its retracted position. Examples of rumble seats can be found in U.S. Pat. Nos. 1,156,408; 1,591,153; 1,751,378; 1,796,081; 1,806,692; 1,816,937; 1,895,832; 2,043,804; 2,880,033; 3,323,828; 3,413,031; 4,103,961; 4,139,232; and 4,182,468. Various other convertible or moveable seat configurations can be found for example in U.S. Pat. Nos. 2,046,175; 3,290,086; 4,699,418; 4,750,778; 5,533,774; 6,237,981; 6,899,367; and 6,899,378.

While these configurations have been suitable for their intended purpose in the past, it would be desirable to provide roll over protection for auxiliary seat occupants. Various retractable roll bar mechanisms are known in the industry, such as those illustrated in U.S. Pat. Nos. 4,557,502 and 5,393,093. While these devices have been suitable for their intended purpose, they do not provide additional passenger capacity for the vehicle. It would be desirable to provide additional passenger capacity with roll over protection.

SUMMARY

In accordance with one aspect of the present invention, a selectively operable rear row seat can carry at least one additional passenger when placed in an extended position. The seat can include a seat back frame moveable between a retracted position and an extended position, and a roll bar defined by the seat back frame for movement with the seat back frame between the retracted and extended positions. The roll bar/seat back frame can provide roll over protection for the seat occupants when in an extended position.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
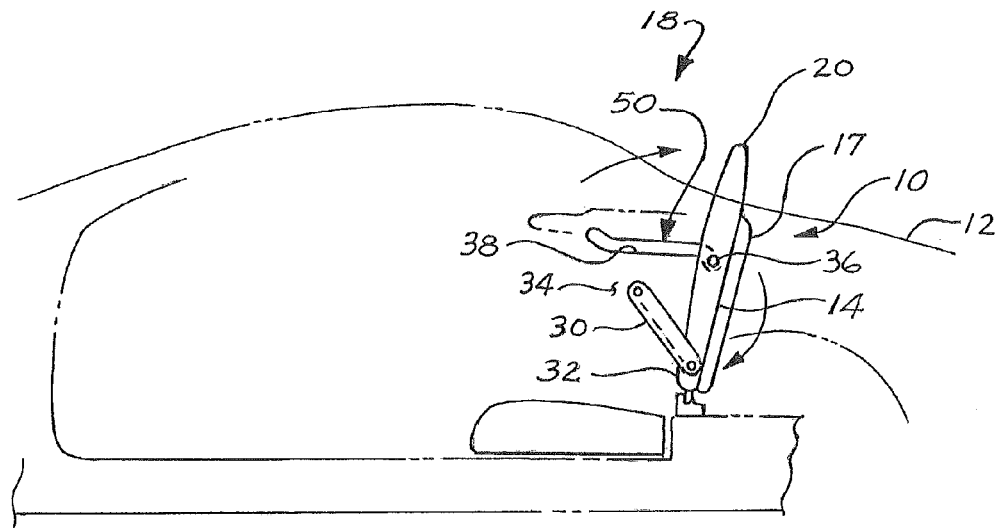
FIG. 1 illustrates a motor vehicle with a selectively operable rear row seat for carrying at least one additional passenger when in an extended position while providing an uninterrupted exterior vehicle contour when in a retracted position.

Referring now to FIG. 1, a selectively operable rear row seat 10, sometimes referred to herein as a stowable seat, rumble seat, or jump seat, is provided for carrying at least one additional passenger when in an extended position, while providing a part of the contour or structure of the vehicle's exterior body when in a retracted positon. The body contour of vehicle 12 is shown in phantom line. A seat back frame 14 can be moved between a retracted position 16 (best seen in FIG. 3) and an extended position 18 (best seen in FIGS. 1-2 and 4-5). A roll bar 20 is defined by and/or forms at least a portion of the seat back frame 14 for movement with the seat back frame 14 between the retraced position 16 and the extended position 18.

Figure 2:
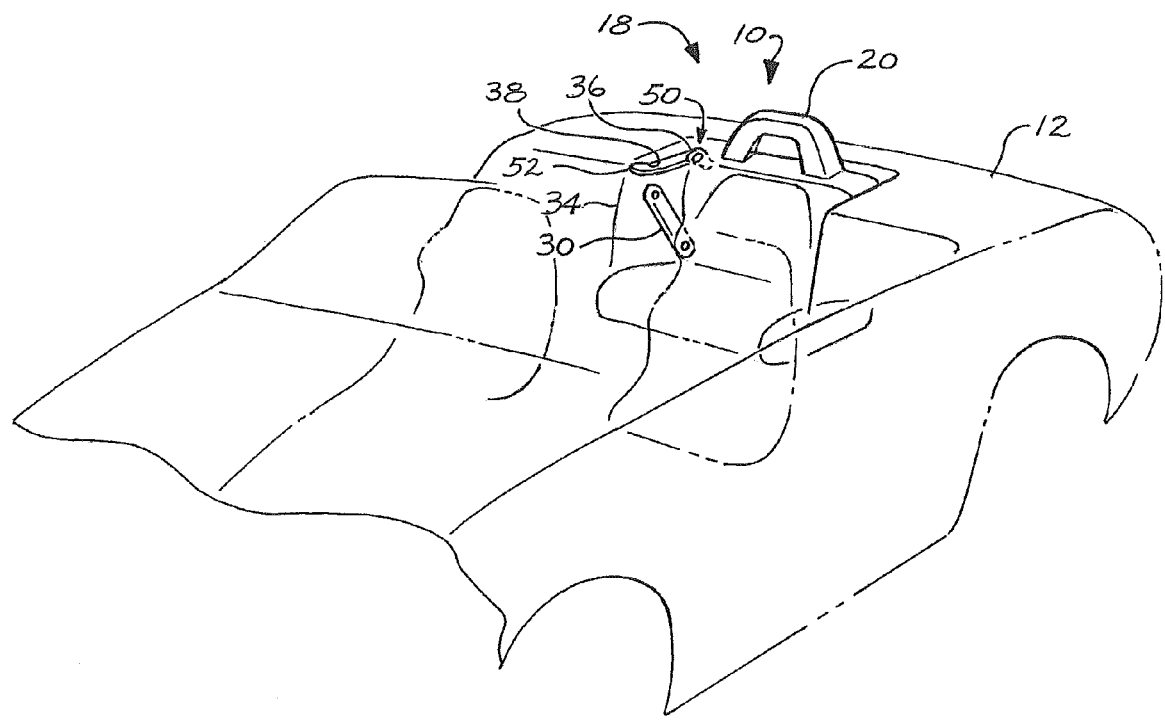
FIG. 2 shows a perspective view of the vehicle with the stowable passenger seat illustrated in FIG. 1.

Referring now to FIGS. 1 and 2, the combination seat back frame 14 and roll bar 20 can be mountable along a center axis of the body contour of vehicle 12. The combination seat back frame 14 and/or roll bar 20 can be made of a high strength metallic material. The roll bar 20 can have a generally U-shaped configuration. The roll bar can have a generally rectangular cross-section.

Figure 3:
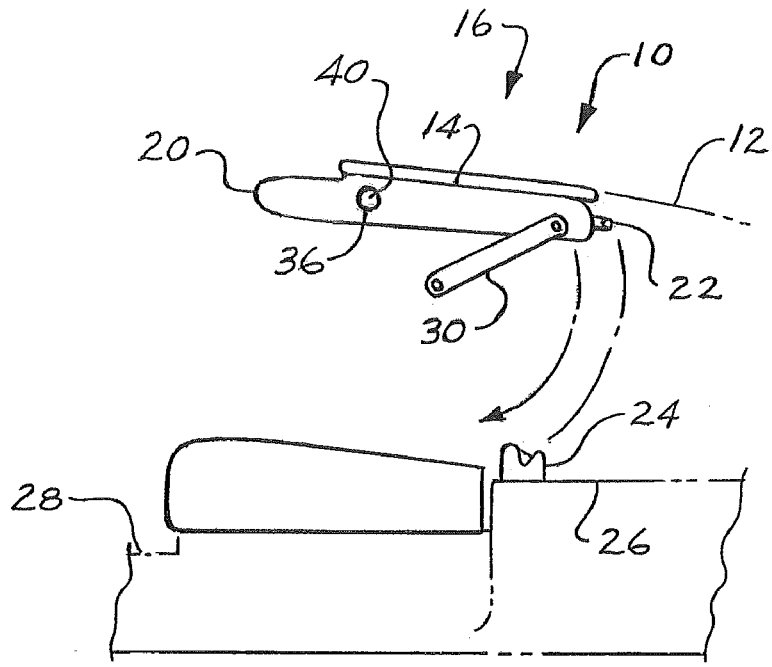
FIG. 3 is a side elevational view of the stowable rumble seat illustrated in FIGS. 1 and 2 when in the retracted position.

A exterior surface portion 17 may be optionally attached to seat back frame 14 (as best seen in FIG. 3), so that when seat back frame 14 is moved to its retracted position, exterior surface portion 17 is positioned to define a portion of the body contour of vehicle 12. Exterior surface portion 17 may be painted the same color as the rest of the body contour of vehicle 12. In place of exterior surface portion 17, a separate decorative or protective exterior contour cover (not shown) may be provided to cover seat back frame 14 when it is in retracted position 18.

Figure 4:
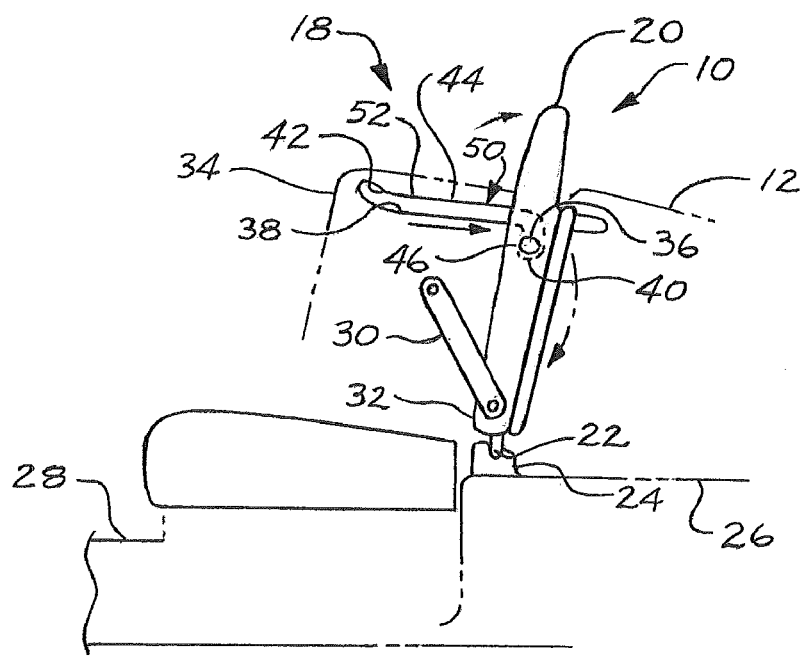
FIG. 4 is a side elevational view of the stowable rumble seat illustrated in FIGS. 1-3 when in an extended position.

Referring now to FIGS. 3 and 4, distal ends 22 of the seat back frame 14 and combined roll bar 20 can connect with an interconnect mechanism, or releasable latch mechanism 24 associated with a vehicle frame member 26 located adjacent a floor 28 of the vehicle 12. Additional reinforcement structure can be provided to carry expected loads from the roll bar 20 if necessary. A plurality of elongate linkages 30 can be provided for guiding movement of the combination seat back frame 14 and roll bar 20 between the retracted and extended positions. At least one linkage 30 can be associated with each side of the seat back frame 14. The at least one linkage 30 can be connected to a lower portion 32 of the combined seat back frame 14 and roll bar 20 at one end and can be rotatably supported from a vehicle frame member 34 at an opposite end.

A plurality of guide surfaces 36 can be provided for guiding movement of the combination seat back frame 14 and roll bar 20 between the retracted and extended positions. At least one guide surface 36 can be associated with each side of the combination seat back frame 14 and roll bar 20. Corresponding complementary guide surfaces 38 can be associated with a vehicle frame member 34 on opposite sides of the combination seat back frame 14 and roll bar 20. The plurality of guide surfaces 36 can operably interact with the corresponding complementary guide surfaces 38 during movement of the combined seat back frame 14 and roll bar 20 between the retracted position 16 and the extended position 18.

Figure 5:
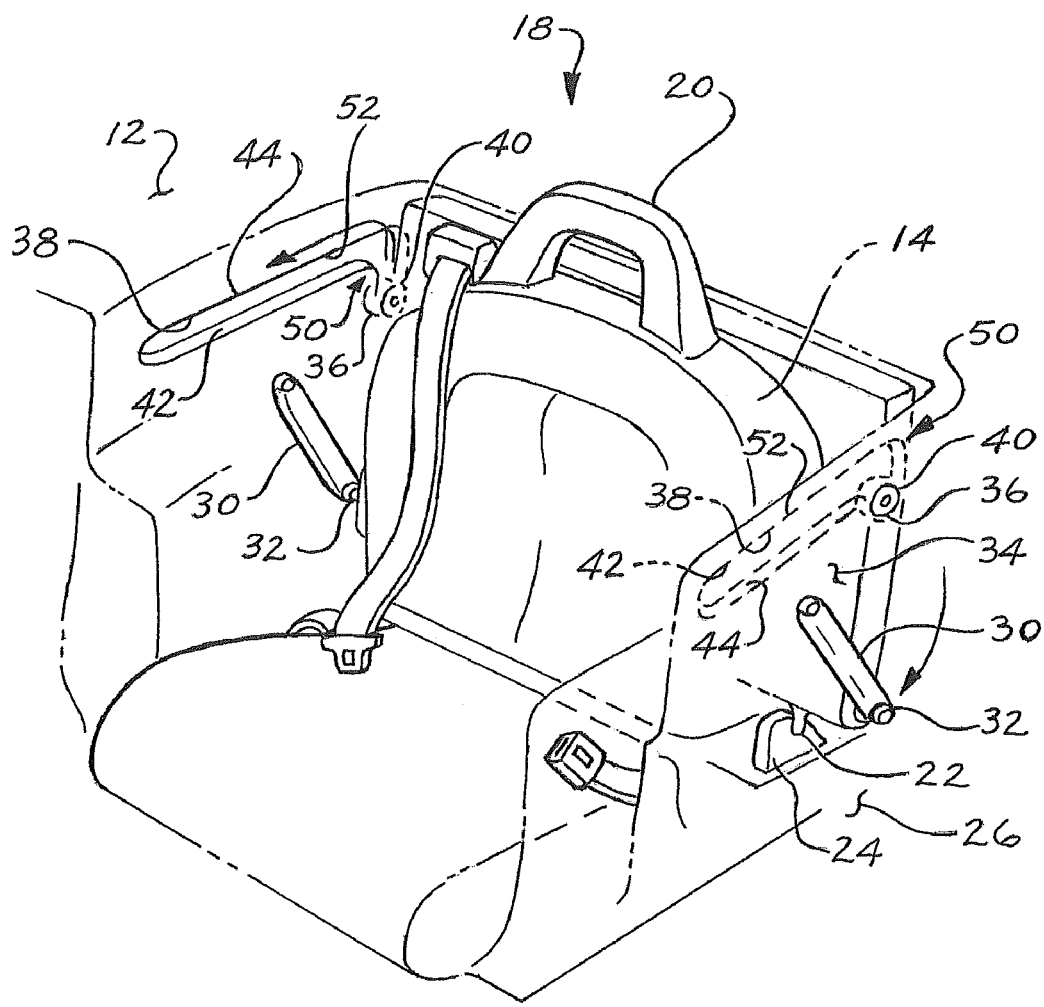
FIG. 5 is a perspective view of the stowable rumble seat illustrated in FIGS. 1-4 when in the extended position.

By way of example and not limitation, the plurality of guide surfaces 36 can be defined by rollers 40. By way of example and not limitation, the corresponding complementary guide surfaces 38 can be defined by roller-receiving track mechanisms 42. By way of example and not limitation, as best illustrated in FIG. 5, each of the roller-receiving track mechanisms 42 can define an L-shaped track configuration with an upper horizontally extending segment 44 and a lower vertically extending segment 46. It will be seen that when seat back frame 14 is in its retracted position 16, roll bar 20 is aligned with the upper horizontally extending segment 44 as rollers 40 move along track mechanism 42.

In the above-described embodiment, a stowable rumble seat 10 can be provided for increasing passenger capacity of a motor vehicle 12 by at least one occupant. It should be recognized by those skilled in the art that the width of the seat 10 can be increased to accommodate more than one occupant if desired. The rumble seat 10 can include a combination seat back frame 14 and roll bar 20 moveable between a retracted position 16 and an extended position 18. The combination seat back frame 14 and roll bar 20 can be selectively operated for carrying at least one additional passenger when in the extended position 18. The combination seat back frame 14 and roll bar 20 can provide a portion of the body contour of vehicle 12 when in the retracted position 16.

It is to be understood that the invention is not to be limited to the above-described embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A selectively operable rear row seat system for carrying at least one additional passenger in a vehicle, comprising:
    at least one vehicle frame member;
    a seat back frame mountable to the at least one vehicle frame member, such that the seat back frame is movable between a retracted position and an extended position; and
    a roll bar defined at least in part by the seat back frame for movement with the seat back frame between a stowed position when the seat is in the retracted position and a deployed position when the seat is in the extended position, the roll bar defined by a generally U-shaped structural member having two laterally spaced apart legs with outer ends to be interlocked with respect to the at least one vehicle frame member when in the extended position and an opposite closed end, the seat back frame extending between and defined at least in part by the two laterally spaced apart legs of the U-shaped structural member.

2. The seat system of claim 1, wherein the seat back frame is mountable along a center axis of a vehicle.

3. The seat system of claim 1, further comprising:
    a plurality of elongate linkages, at least one linkage associated with each side of the seat back frame, the at least one linkage connected to a lower portion of the seat back frame at one end and rotatably supported from a vehicle frame member at an opposite end.

4. The seat system of claim 1, further comprising:
    a plurality of guide surfaces, at least one guide surface associated with each side of the seat back frame.

5. The seat system of claim 4, further comprising:
    corresponding complementary guide surfaces associated with a vehicle frame member on opposite sides of the seat back frame, wherein the plurality of guide surfaces operably interact with the corresponding complementary guide surfaces during movement of the seat back frame between the retracted and extended positions.

6. The seat system of claim 5, wherein the plurality of guide surfaces define rollers, and the corresponding complementary guide surfaces define roller-receiving tracks.

7. The seat system of claim 6, wherein each of the roller-receiving tracks define an L-shaped configuration with an upper horizontally extending segment and a lower vertically extending segment.

8. The seat system of claim 1, wherein the roll bar is made of a high strength metallic material.

9. The seat system of claim 1, wherein the roll bar has a generally rectangular cross section.

10. The seat system of claim 1 further comprising:
    an interconnect mechanism of a vehicle frame member located near a floor of the vehicle connectible with distal ends of the seat back frame, the seat back frame pivotably mounted to the vehicle frame member at a connection point generally located between a middle portion and an upper portion of the seat back frame in a manner suitable for load bearing transfer of forces when the seat back frame is in the extended position and latched with the interconnect mechanism.

11. A vehicle having a stowable passenger seat, comprising:
    a combination seat back frame and integrally formed roll bar movable between a retracted position and an extended position, the combination seat back frame and roll bar selectively operable for carrying at least one additional passenger when in the extended position, the combination seat back frame and integrally formed roll bar defined by a common, generally U-shaped structural member having two laterally spaced apart legs at one end and a laterally extending portion enclosing space between the two legs at an opposite end, the seat back frame extending between, and defined at least in part by, the two laterally spaced apart legs of the common, generally U-shaped structural member, and the roll bar defined by the common, generally U-shaped, structural member; and
    an exterior surface portion of the stowable passenger seat configured to provide an exterior body contour surface of the vehicle when the combination seat back frame and roll bar is moved into the retracted position.

12. A vehicle having a stowable passenger seat, comprising:
    a combination seat back frame and roll bar movable between a retracted position and an extended position, the combination seat back frame and roll bar selectively operable for carrying at least one additional passenger when in the extended position;
    an exterior surface portion configured to provide a body contour surface of the vehicle when the combination seat back frame and roll bar is moved into the retracted position; and
    a combination of a track mechanism and a plurality of rotatable elongate linkages guiding movement of the combination seat back frame and roll bar between the retracted and extended positions.

13. The vehicle of claim 12, wherein the plurality of rotatable elongate linkages includes at least one linkage associated with each side of the combination seat back frame and roll bar, the at least one linkage connected to a lower portion of the combination seat back frame and roll bar at one end and rotatably supported from a vehicle frame member at an opposite end.

14. The vehicle of claim 12, wherein the track mechanism includes a plurality of guide surfaces, at least one guide surface associated with each side of the combination seat back frame and roll bar.

15. The vehicle of claim 14, wherein the track mechanism includes corresponding complementary guide surfaces associated with a vehicle frame member on opposite sides of the combination seat back frame and roll bar, wherein the plurality of guide surfaces operably interact with the corresponding complementary guide surfaces during movement of the combination seat back frame and roll bar between the retracted and extended positions.

16. The vehicle of claim 15, wherein the plurality of guide surfaces define rollers, and the corresponding complementary guide surfaces define roller-receiving tracks.

17. The vehicle of claim 12, wherein the track mechanism includes a guide track having an L-shaped configuration with an upper horizontally extending segment and a lower vertically extending segment.

18. The vehicle of claim 12 wherein the roll bar is made of a high strength metallic material.

19. The vehicle of claim 12, wherein the roll bar has a generally U-shaped configuration and rectangular cross section.

20. The vehicle of claim 12, wherein distal ends of the combination seat back frame and roll bar are connectible with an interconnect mechanism of a vehicle frame member located near a floor of the vehicle.

21. A rumble seat for increasing passenger capacity of a vehicle by at least one occupant, the rumble seat comprising:

a combination seat back frame and roll bar movable between a retracted position and an extended position, the combination seat back frame and roll bar selectively operable for carrying at least one additional passenger when in the extended position, while providing a body contour surface for the vehicle when in the retracted position;

a combination of a track mechanism and a plurality of rotatable elongate linkages guiding movement of the combination seat back frame and roll bar between the retracted and extended positions, wherein the track mechanism includes a guide track having an L-shaped configuration with an upper horizontally extending segment and a lower vertically extending segment, and the plurality of rotatable elongate linkages includes at least one linkage associated with each side of the combination seat back frame and roll bar, the at least one linkage connected to a lower portion of the combination seat back frame and roll bar at one end and adapted to be rotatably supported from a vehicle frame member at an opposite end; and a releasible latch mechanism associated with a vehicle frame member located adjacent to a floor of the vehicle, wherein distal ends of the combination seat back frame and roll bar connectibly engage with the releasible latch mechanism when the combination seat back frame and roll bar are in the extended position.

\* \* \* \* \*